Aug. 14, 1956

V. WEBER ET AL 2,759,071

ADJUSTABLE DIFFERENTIAL FAN CONTROL

Filed Jan. 3, 1955

INVENTORS
Victor Weber and
William J. Russell

BY Albert J. Henderson

THEIR ATTORNEY.

INVENTORS
*Victor Weber and
William J. Russell*

BY

THEIR ATTORNEY.

United States Patent Office 2,759,071
Patented Aug. 14, 1956

2,759,071

ADJUSTABLE DIFFERENTIAL FAN CONTROL

Victor Weber, Greensburg, and William J. Russell, Jeannette, Pa., assignors to Robertshaw-Fulton Controls Company, Greensburg, Pa., a corporation of Delaware Application January 3, 1955, Serial No. 479,434

8 Claims. (Cl. 200—140)

The present invention relates to a space temperature control and, more particularly, to an adjustable differential fan control for starting and stopping a fan in a hot-air duct.

It has been customary in such applications to provide a thermostatic control having a thermally responsive bulb located in a hot-air duct to control the operation of a fan for driving air through the duct. Thermostatic controls of this type usually employ a snap-acting switch mechanism which opens and closes in response to temperature variations as sensed by the thermally responsive bulb.

The customary snap-acting switch mechanism operates in a predetermined temperature differential range of approximately 12° F. Thus, if such a device were set to "snap on" at 80° F., it would not "snap off" until the temperature as sensed by the thermally responsive bulb dropped to 68° F.

In applications where the temperature change is gradual, a predetermined temperature differential range as above described is satisfactory. However, with this relatively narrow differential range, it has been found that for spaces which undergo relatively fast temperature changes, the fan would operate incessantly for short intervals with consequent undue wear on the equipment. Therefore, it is an object of this invention to incorporate in a thermostatic control, a means for varying the operating temperature differential range in which the control will operate.

Another object of this invention is to incorporate in a thermostatic control, a means whereby the operating temperature differential range may be varied without affecting the calibration of the control.

Another object of this invention is to incorporate in a thermostatic control, an emergency manual control which will permit the continuous running of the fan without thermostatic control.

In the preferred embodiment of the invention, a thermostatic control is provided wherein the energization of a fan motor is under control of a snap-acting switch which in turn is controlled by a mechanism responsive to the temperature of the medium upstream from the fan. Means is provided for varying the differential temperature range in which the switch will be actuated and includes an adjustment means which is adapted to vary the distance through which the thermostatic control must move in order to actuate the switch.

Other objects and advantages will become apparent from the following description taken in connection with the accompanying drawing wherein.

Figure 1:
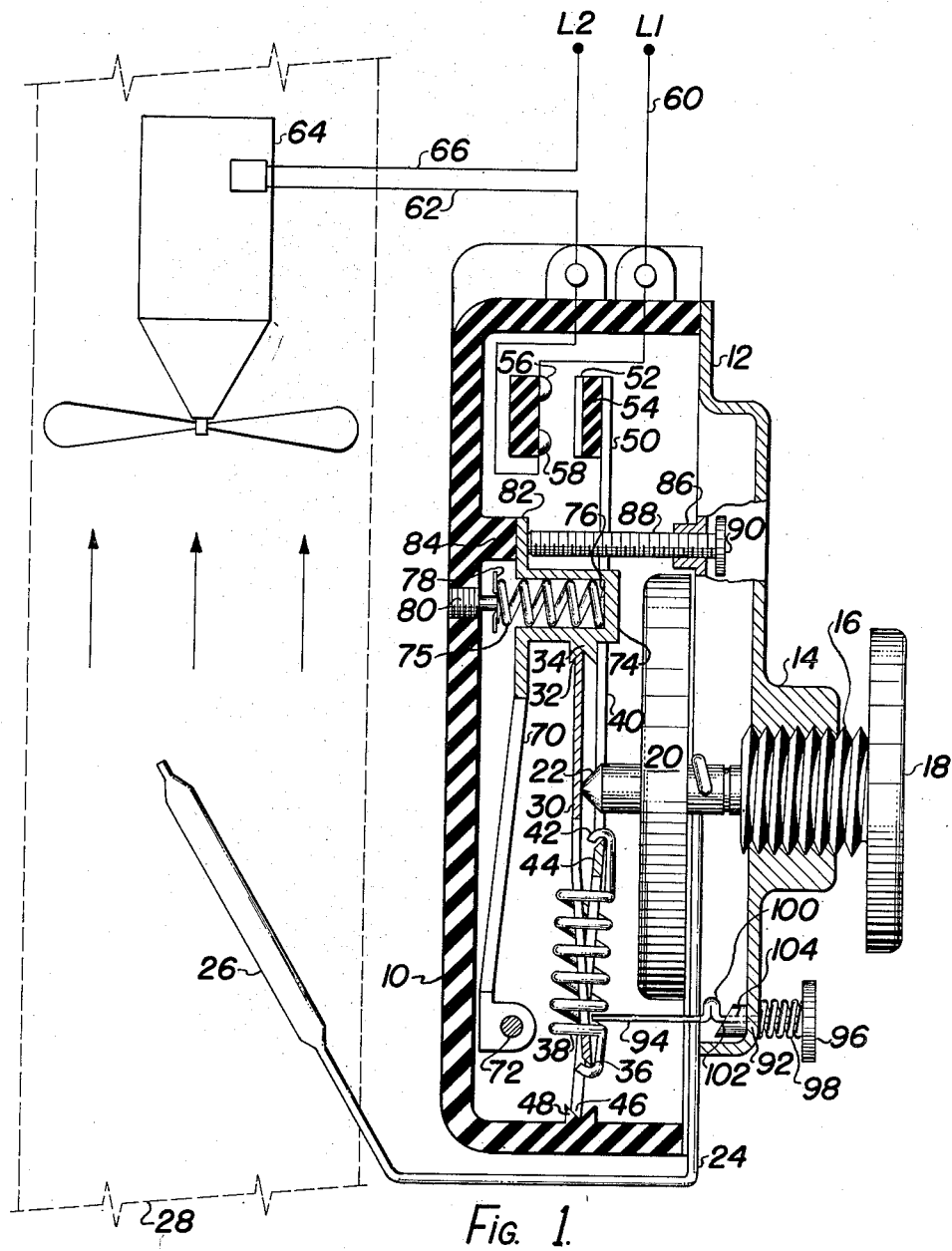
Fig. 1 is a longitudinal sectional view of a control device embodying the invention showing a minimum temperature differential setting with the switch open and a schematic arrangement with a conventional control fan and an air duct.

Referring more particularly to Fig. 1, a generally rectangular casing 10 of insulating material is provided with a cover 12 for the open end thereof, carrying a centrally disposed bushing 14. A temperature adjustment screw 16, preferably provided with left-hand threads, is cooperable with the bushing 14 and carries on its exterior end the usual dial 18 by means of which the adjusting screw 16 can be rotated.

Temperature responsive means in the form of an expansible and contractible diaphragm 20 is carried on the interior end of the adjusting screw 16 and has an operating button 22 projecting therefrom. The interior of the diaphragm 20 is in communication with a capillary tube 24 which extends exteriorly of the cover 12 for communication with the usual bulb element 26 located in a hot-air duct 28. As is well known, the temperature responsive means contains a liquid which expands upon the bulb being heated and serves to actuate the diaphragm 20 sufficiently to operate the parts now to be described.

The operating button 22 abuts a face of a main actuating lever 30 of a snap-action mechanism. The main actuating lever 30 is provided at one end with a knife edge 32 which is cooperable with a support 34 on a lever which will be described more fully hereinafter. The opposite end of the lever is also provided with a knife edge 36 around which one end of a coil spring 38 is hooked. It will be apparent to those skilled in the art that any temperature may be set by the dial 18 and any adjustment thereof serves to position the diaphragm 20 a smaller or greater distance with respect to the snap-action mechanism.

A main control lever 40 is provided with a knife edge 42 formed in a center portion 44 thereof, for receiving the opposite hooked end of the coil spring 38. The lower portion of the control lever 40 is provided with a knife edge 46 for cooperation with a suitable bearing formed on a stationary support 48 of the casing 10. The upper portion 50 of the control lever 40 carries a contact bridge 52 at the extreme end thereof which is insulated from the leg 50 by an insulating pad 54. The contact bridge 52 cooperates with a pair of fixed contacts 56, 58 secured to the casing 10 by any suitable means. The contact 56 is connected directly to a lead line L1 and the contact 58 is connected by a conductor 62 to one side of a fan motor 64 located within the duct 28. To complete the circuit, a conductor 66 connects the other side of the fan motor 64 to a lead line L2.

The structure so far described constitutes a snap-action mechanism by means of which the control lever 40 can effect contact operation. Referring now more particularly to the position of the snap-action mechanism shown in Fig. 1, it will be apparent to those skilled in the art that a line between the support 34 and the support 48 defines a center or snap line for the mechanism. Thus, as the liquid in the bulb 26 and capillary tube 24 expands in response to temperatures prevailing at the point where the bulb is located, the diaphragm 20 will also expand resulting in movement of the operating button to the left which causes the main actuating lever 30 to pivot clockwise on the support 34. Due to tension of the spring 38, the main actuating lever 40 will be moved to the left with a snap action to allow the contact bridge 52 to bridge the contacts 56, 58 as the knife edge 36 moves overcenter past the defined snap line.

Figure 2:
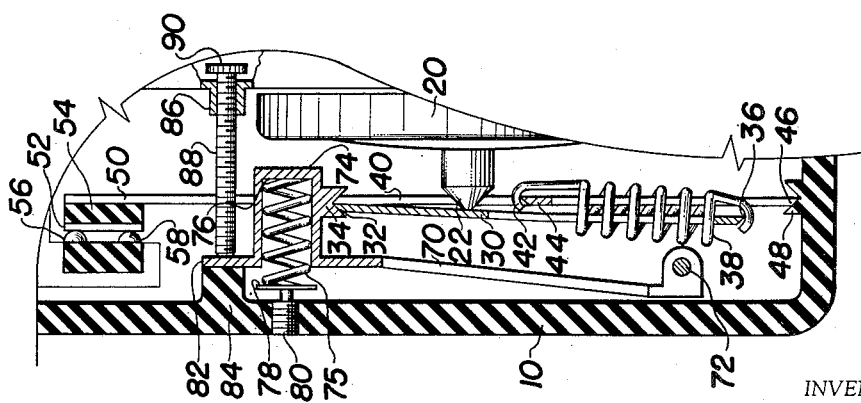
Fig. 2 is a longitudinal sectional view of a portion of the control device showing a minimum temperature differential setting with the switch closed.

The closed position of the switch 52, 58, 56 as shown in Fig. 2 will continue until the diaphragm 20 starts to contract upon cooling of the bulb 26 whereupon a similar overcenter snap action will occur but in the opposite direction to cause contact disengagement as the actuating lever 30 resumes the position as shown in Fig. 1. An operating temperature differential of approximately 12° F. exists between the snap close and snap open position of the device. Snap-acting mechanisms of the above-described type are well known in the art and further description is deemed unnecessary.

It is apparent from the above description that if the position of the support 34 as shown in Fig. 1 could be moved to the right during contraction of the diaphragm 20, the snap or center line established by the supports 34, 48 would be moved correspondingly to the right to effect the snap opening of the switch 52, 56, 58 at a lower temperature thus increasing the operating temperature differential of the device. To this end the support 34 is formed on a novel lever 70 which is pivoted at 72 to one end of the casing 10. The lever 70 extends longitudinally of the housing 10 and has a cup-shaped portion 74 located at one end remote from the pivot 72. The support 34 for the actuating lever 30 is preferably made integral with one side of the cup portion 74 substantially as shown in the drawing. A coil spring 75 is held in compression between the bottom surface 76 of the cup-shaped portion 74 and a disc 78 which is adjustably secured to the housing 10 by an adjusting screw 80. Rotation of the adjusting screw 80 serves to adjust the compressive force of the spring 75 by varying the position of the disc 78. The coil spring 75 thus biases the cup portion 74, the support 34 and consequently the levers 30 and 40 to the right as viewed in Fig. 1.

To restrict movement of the lever 70 under the bias of the spring 75, an adjustable stop mechanism is provided to limit the extent of the bias. The cup portion 74 has projecting therefrom a flange 82 which is adapted to seat upon a rigid stop 84 projecting internally of the casing 10 from a wall thereof. A threaded bushing 86, located on the cover 12, receives an adjusting screw 88 which projects through the cover 12 and is provided at the projecting end with a manually operable knob 90. The other end of the screw 88 serves as an abutment for the flange 82. Thus, movement of the lever 70 is limited by the rigid stop 84 and the adjusting screw 88.

The effect of lever 70 on the operating temperature differential will become apparent from the action of the springs 38, 75 and the snap-action mechanism. Referring now to Figs. 1 and 2, it will be obvious to those skilled in the art that the actuating lever 30 exerts a greater force on the operating button 22 before snap-closing of the switch 56, 58, 52 as shown in Fig. 1 than after, as shown in Fig. 2. Thus, a greater force must be exerted by the operating button 22 to cause movement of the lever 30 before the snap action than after. In this invention the spring 38 is adapted to cause a force of approximately 6 lb. to be exerted by the lever 30 on the operating button 22 before snap action as shown in Fig. 1 and a force of approximately 3 lb. after snap action as shown in Fig. 2.

It will be noted in Figs. 1 and 2 that the adjusting screw 88 is forcing the flange 82 into engagement with the stop 84 and preventing movement thereof. Thus, the position of lever 70 is fixed with respect to the casing 10, and the supports 34, 48 define a fixed snap line for the snap mechanism. In this position of the adjusting screw 88 and lever 70, minimum operating differential will occur.

Figure 4:
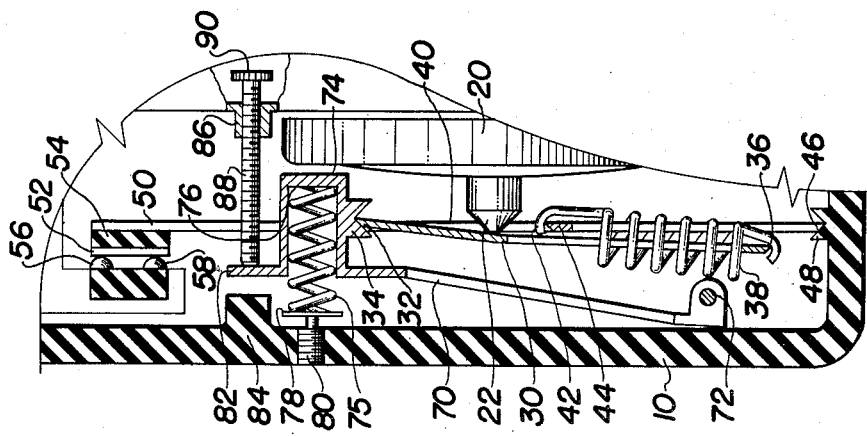
Fig. 4 is a longitudinal sectional view of a portion of the control device showing an increased temperature differential setting with the switch closed.
Figure 3:
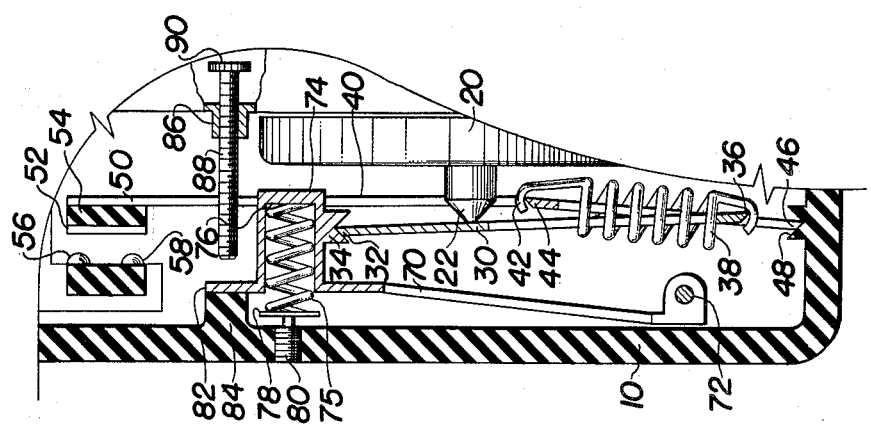
Fig. 3 is a longitudinal sectional view of a portion of the control device showing an increased temperature differential setting with the switch open.

Referring now to Figs. 3 and 4 it will be noted that the knob 90 has been suitably rotated to move the adjusting screw 88 away from the stop 84. Thus, the lever 70 is permitted to pivot about 72 between the stop 84 and the adjusting screw 88. As hereinbefore described, the operating button must exert a 6 lb. force on the lever 30 to cause movement thereof before snap action but only a 3 lb. force to cause movement thereof following snap action. The spring 75 is adjusted by the adjusting screw 80 to exert a 4 lb. force on the portion 74 and thus opposes the force of the operating button 22 on the snap mechanism.

Before snap action, the 6 lb. force of the operating button on the lever 30 will overcome the 4 lb. force of the spring 75 on the lever 70, thus the flange 82 will engage the stop 84 before snap action occurs as shown in Fig. 3. However, as soon as snap action occurs, the force of the operating button 22 on the lever 30 will only be 3 lbs. and no longer strong enough to overcome the force of the spring 75. Thus, the lever 70 will pivot clockwise till the flange 82 engages the adjusting screw 88 to assume the position as shown in Fig. 4. Although the forces exerted by the snap action mechanism and the spring 75 have been specifically defined for the purposes of this description, it will be noted that the forces may be substantially changed as long as the spring 75 is adjusted to cause a force intermediate the forces caused by the snap action mechanism before and after snap action.

It can now be seen that the position of the snap line as defined by the supports 34, 48 has changed. The support 34 is now in a position nearer to the diaphragm 20 than before as a result of the movement of the lever 70. Thus, it will be necessary for the diaphragm 20 to contract more before snap opening of the switch 52, 56, 58 occurs, increasing the temperature differential between the snap opening and snap closing of the switch 52, 56, 58 and accomplishing the main object of this invention. Immediately upon snap opening of contacts 52, 56, and 58, the force on lever 30 is again 6 lb., thus pivoting lever 70 counterclockwise until flange 82 is at rest on stop 84. Thus, the snap line is shifted to its original position as shown in Fig. 2. From the above description of the operation, it is readily apparent that there are an infinite number of possible snap lines, thus providing an infinite temperature differential range. It will also be noted that one snap line is always constant—this is the snap closed position. Thus, one snap point is always a function of the stop 84, while the other varies per the setting of screw 88.

To provide for emergency manual operation of the device, a means is provided to hold the switch 52, 56, 58 in a closed position. Referring now to Fig. 1, the lower end of the cover 12 is provided with an aperture 92 for slidably receiving a pin 94. The pin 94 projects outwardly from the cover 12 and terminates in a manually adjustable knob 96. A coil spring 98 is held in compression between the inner surface of the knob 96 and the outer surface of the cover plate 12 for normally biasing the pin 94 outwardly to an inoperative position. The other end of the pin 94 projects interiorly of the housing 10 and is adapted to abut the lower portion of the actuating lever 30. Intermediate the ends of the pin 94, a loop 100 is formed thereon and is adapted to ride upon an inclined surface 102 of a cam 104 secured to the inner surface of the cover 12 by any suitable means adjacent to the loop 100. As shown in Fig. 1, the pin 94 is shown as in an inoperative position wherein the end thereof adjacent the lever 30 is free of contact with the lever 30. Manual rotation of the knob 96 drives the loop 100 along the inclined surface 102 thereby forcing the pin to the left as shown in the drawing and carrying with it the lower end of the actuating lever 30 such that the control lever 40 is moved to the left. Movement of the upper leg 50 of the control lever 40 forces the conductor bridge 52 against the contacts 56, 58 thereby closing the circuit to the fan motor 64. Conversely, rotation of the knob 96 in the other direction releases the bridge 52 and the fan motor 64 is again under control of the thermostatic system 20, 24, 26.

*Operation*

As shown in Fig. 1, the contact 56 is connected to a lead line L1 and the contact 58 is connected by a conductor 62 to one side of a fan motor 64 located within the duct 28. The conductor 66 connects the other side of the fan motor 64 to a lead line L2 and completes the circuit. The bulb element 26 is located in the duct 28 upstream of the fan motor 64. The knob 18 may be rotated to vary the position of the diaphragm 20 with respect to the main actuating lever 30 and thus vary the temperature at which the switch 52, 56, 58 will snap close.

Assuming now a minimum differential setting as shown in Figs. 1 and 2, the adjusting screw 88 will be holding the flange 82 in engagement with the stop 84 thus preventing movement of the lever 70 to define a fixed snap line between the supports 34, 48. Should the temperature in the air duct increase, expansion of the diaphragm 20 will occur and the operating button 22 will move to the left to force the lever 30 to rotate clockwise on the support 34. As the knife edge 36 moves over center past the snap line, the main actuating lever 40 will be moved toward the contacts 56, 58 to allow the conductor bar 52 to bridge the contacts 56, 58 with a snap action, thus assuming the position shown in Fig. 2. Further expansion of the diaphragm 20 will result in further clockwise rotation of the lever 30.

As the air duct 28 cools upon action of the fan, contraction of the diaphragm 20 will occur causing movement of the operating button 22 toward the plate 12 and permitting counterclockwise movement of the lever 30 about the support 34. A similar overcenter snap action will then occur but in the opposite direction to cause contact disengagement as the actuating lever 30 resumes the position as shown in Fig. 1.

Should the fan be operating incessantly for short intervals due to rapid temperature changes in the air duct, the knob 90 may be rotated to effect an increased operating differential in the snap action mechanism. Referring now to Figs. 3 and 4, it will be apparent that the lever 70 is free to pivot about 72 between the stop 84 and adjusting screw 88. As shown in Fig. 3, expansion of the diaphragm 20 forces the lever 70 against the stop 84 before the snap action occurs as a result of the 6 lb. force of the button 22 on the lever 30 overcoming the 4 lb. force of the spring 75 on the lever 70. Further expansion of the diaphragm 20 causes the knife edge 36 to move across the snap line defined by the supports 34, 48 which results in the snap closing of the switch 52, 56, 58. Upon the closing of the switch 52, 56, 58, the force of the button 22 on the lever 30 has lessened to 3 lb. and the 4 lb. force of the spring 75 on the lever 70 pivots the lever 70 clockwise till the flange 82 engages the adjusting screw 88, as shown in Fig. 4.

As the air duct 28 cools upon action of the fan, contraction of the diaphragm 20 will occur causing movement of the operating button 22 toward the plate 12 and permitting counterclockwise movement of the lever 30 about the support 34 as before. The flange 82 of the lever 70 remains in engagement with the adjusting screw 88 until the knife edge 36 crosses the snap line defined by the supports 48, 34. Since the snap line has moved toward the diaphragm 20, further contraction of the diaphragm 20 will be required to effect snap action than before, thus the temperature at which the switch 52, 56, 58 will snap open will be less than before, increasing the temperature differential of the snap action mechanism.

It will be noted that the snap closing of the switch 52, 56, 58 occurs at the same temperature during expansion of the diaphragm 20 regardless of the differential setting. Increasing the operating temperature differential only decreases the temperature at which the switch 52, 56, 58 will close, thus the dial 18 may be calibrated for temperatures necessary to close the switch 52, 56, 58 and be unaffected by changes in the operating temperature differential effected by rotation of the knob 90. This is an important feature of the invention.

It may be desired to manually control the energization of the fan motor 64, say to prevent the overheating of the duct 28 or for any other emergency measure wherein continuous operation of the fan motor 64 is required. In this event, the knob 96 is rotated and the pin 94 moved inwardly to force the lever 30 toward the pivot 72 beyond its snap-action center position, whereby the control lever 40 is moved toward the contacts 58, 56 to effect closing of the circuit to the fan motor 64. With the pin 94 in this position, the fan motor 64 will continue to operate regardless of the temperature demands sensed by the bulb 26. This, in effect, prevents the thermostatic actuation of the control device which can again be thermostatically actuated by rotating the knob 96 so that the pin 94 becomes disengaged from the lever 30.

Although a preferred embodiment of this invention has been shown and described herein, it is to be understood that the invention is not limited to the details of construction and arrangement of parts disclosed but is to be interpreted as claimed.

We claim:

1. A thermostatic control device comprising switch means movable between a plurality of controlling positions, thermally responsive means including a member movable in one direction in response to an increase in a temperature condition and in an opposite direction in response to a decrease in said temperature condition, a switch actuating lever, a tension spring having one end anchored intermediate the ends of said switch actuating lever, a switch control lever cooperable with said switch actuating lever and having one end carried by the opposite end of said spring, said member engaging said control lever intermediate its ends and producing deflection of said control lever and movement of said switch means to said controlling positions in response to predetermined movements in opposite directions of said member, a differential adjustment lever mounted for rotation adjacent one end and having a recessed portion intermediate the ends thereof, a support on the outer periphery of said recessed portion, said control lever having one end carried by said support whereby movement of said differential adjustment lever shifts the position of said control lever, means engaging said recessed portion and urging said differential adjustment lever toward said member, and an adjustable stop positioned to engage said differential adjustment lever and to fix the position of said differential adjustment lever in one direction of rotation whereby movement of said switch means to one of said controlling positions is caused by further movement of said member in one of said directions beyond one of said predetermined positions.

2. A thermostatic control device comprising switch means movable between a plurality of controlling positions, thermally responsive means including a member movable in one direction in response to an increase in a temperature condition and in an opposite direction in response to a decrease in said temperature condition, a switch actuating lever for moving said switch means to said controlling positions, a tension spring having one end anchored intermediate the ends of said switch actuating lever, a switch control lever cooperable with said switch actuating lever and having one end carried by the opposite end of said spring, said member engaging said control lever intermediate its ends and producing deflection of said control lever and movement of said switch means to said controlling positions in response to predetermined movements in opposite directions of said member, a differential adjustment lever mounted for rotation adjacent one end and having a recessed portion intermediate the ends thereof, a support on the outer periphery of said recessed portion, said control lever having the opposite end thereof carried by said support whereby the position of said control lever may be varied by changing the position of said differential adjustment lever, means engaging said recessed portion and urging said differential adjustment lever toward said member, and an adjustable stop positioned to engage said differential adjustment lever for selectively changing the position of said differential adjustment lever and said control lever whereby movement of said switch means to said controlling positions is caused by further movement of said member in one of said directions beyond one of said predetermined positions.

3. A thermostatic control device comprising switch means movable between a plurality of controlling positions, thermally responsive means including a member movable in one direction in response to an increase in a temperature condition and in an opposite direction in response to a decrease in said temperature condition, a switch actuating lever for moving said switch means to said controlling positions, a tension spring having one end anchored intermediate the ends of said switch actuating lever, a switch control lever cooperable with said switch actuating lever and having one end carried by the opposite end of said spring, said member engaging said control lever intermediate its ends and producing deflection of said control lever and movement of said switch means to said controlling positions in response to predetermined movements in opposite directions of said member, a differential adjustment lever mounted for rotation adjacent one end and having a recessed portion intermediate the ends thereof, a support on the outer periphery of said recessed portion, said control lever having the opposite end thereof carried by said support whereby movement of said differential adjustment lever varies the position of said control lever with respect to said member, means engaging said recesed portion and urging said differential adjustment lever towards said member, means to adjust the bias of said last named means, and an adjustable stop positioned to engage said differential adjustment lever for varying the position of said control lever with respect to said member whereby movement of said switch means to said controlling positions is caused by further movement of said member in one of said directions beyond one of said predetermined positions.

4. A thermostatic control device comprising switch means movable between a plurality of controlling positions, thermally responsive means including a member movable in one direction in response to an increase in a temperature condition and in an opposite direction in response to a decrease in said temperature condition, a switch actuating lever, a tension spring having one end anchored intermediate the ends of said switch actuating lever, a switch control lever cooperable with said actuating lever and having one end carried by the opposite end of said spring, said member engaging said control lever intermediate its ends and producing deflection of said control lever and movement of said switch means to said controlling positions in response to predetermined movements in opposite directions of said member, a differential adjustment lever mounted for rotation adjacent one end and having a recessed portion intermediate the ends thereof, a support on the outer periphery of said recessed portion, said control lever having one end carried by said support whereby the position of said control lever with respect to said member may be varied by movement of said differential adjustment lever, means engaging said recessed portion and urging said differential adjutment lever and said control lever towards said member, an adjustable stop positioned to engage the free end of said differential adjustment lever to selectively vary the position of said differential adjustment lever and control lever with respect to said member, and a locking means for moving said differential adjustment lever to a fixed position and holding said switch means in one of said controlling positions.

5. A thermostatic control device comprising switch means movable between a plurality of controlling positions, thermally responsive means including a member movable in one direction in response to an increase in a temperature condition and in an opposite direction in response to a decrease in said temperature condition, a switch actuating lever for moving said switch means to said controlling position, a tension spring having one end anchored intermediate the ends of said switch actuating lever, a switch control lever cooperable with said switch actuating lever and having one end carried by the opposite end of said spring, said member engaging said control lever intermediate its ends and producing deflection of said control lever and movement of said switch means to said controlling positions in response to predetermined movements in opposite directions of said member, a differential adjustment lever mounted for rotation adjacent one end and having a recessed portion intermediate the ends thereof, a support on the outer periphery of said recessed portion, said control lever having one end carried by said support whereby movement of said differential adjustment lever shifts the position of said control lever, means engaging said recessed portion and urging said differential adjustment lever and said control lever toward said member, an adjustable stop positioned to engage said lever to fix the position of said lever in one direction of rotation whereby movement of said switch means to one of said controlling positions is caused by further movement of said member in one of said directions beyond one of said predetermined positions, and locking means comprising an elongated, spring-biased, rotatable member normally biased out of engagement with said control lever, a projection on said elongated member, and a fixed cam means cooperable with said projection on said elongated member, said elongated member upon rotation urged into engagement with said control lever for moving said control lever and differential adjustment lever to a fixed position and moving said switch means to one of said controlling positions.

6. In a thermostatic control device including a switch movable between a plurality of controlling positions, thermally responsive means having a member movable in one direction in response to an increase in a temperature condition and in an opposite direction in response to a decrease in said temperature condition, and two levers and a spring cooperable with said member and said switch to move said switch to its controlling positions in response to predetermined movements of said member in opposite directions, differential adjustment means comprising an elongated bar rotatably mounted adjacent one end and having a recessed portion intermediate the ends thereof, a support on the outer periphery of said recessed portion, one of said levers having one end carried by said support whereby said lever is movable with respect to said member upon rotation of said rotatably mounted bar, means engaging said recessed portion and urging said rotatably mounted bar toward said member, and an adjustable stop positioned to engage said rotatably mounted bar to fix the position of said rotatably mounted bar in one direction of rotation whereby movement of said switch to one of said controlling positions is caused by further movement of said member in one of said directions beyond one of said predetermined positions.

7. In a thermostatic control device including a switch movable between a plurality of controlling positions, thermally responsive means provided with a member movable in one direction in response to an increase in a temperature condition and in an opposite direction in response to a decrease in said temperature condition, and two levers and a spring cooperable with said member and said switch to move said switch to its controlling positions in response to predetermined movements of said member in opposite directions, differential adjustment means comprising an elongated bar mounted for rotation adjacent one end and having a recessed portion intermediate the ends thereof, a support on the outer periphery of said recessed portion, one of said levers having one end carried by said support whereby movement of said bar shifts the position of said lever with respect to said member, means engaging said recessed portion and urging said bar toward said member, means to vary the bias of said last named means, and an adjustable stop positioned to engage said bar to selectively vary the position of said bar and said lever whereby movement of said switch to one of said controlling positions is caused by further movement of said member in one of said directions beyond one of said predetermined positions.

8. In a thermostatic control device including a switch movable between a plurality of controlling positions, thermally responsive means having a member movable in one direction in response to an increase in a temperature condition and in an opposite direction in response to a decrease in said temperature condition, and two levers and a spring cooperable with said member and said switch to move said switch to its controlling positions in response to predetermined movements of said member in opposite directions, differential adjustment means comprising an elongated bar mounted for rotation adjacent one end and having a recessed portion intermediate the ends thereof, a support formed on the periphery of said recessed portion, one of said levers having one end carried by said support whereby the position of said lever with respect to said member can be varied by movement of said bar, means engaging said recessed portion and urging said bar toward said member, an adjustable stop positioned to engage said bar to selectively vary the position of said bar with respect to said member whereby movement of said switch to one of said controlling positions is caused by further movement of said member in one of said directions beyond one of said predetermined positions, and a locking means for moving said bar and lever to a fixed position and holding said switch in one of said controlling positions.

References Cited in the file of this patent

UNITED STATES PATENTS

| | | |
|---|---|---|
| 1,988,848 | Kuhn | Jan. 22, 1935 |
| 2,125,627 | Fonseca | Aug. 2, 1938 |
| 2,291,501 | Persons | July 28, 1942 |
| 2,459,522 | Grooms | Jan. 18, 1949 |